United States Patent
Mao

(10) Patent No.: US 12,430,306 B2
(45) Date of Patent: Sep. 30, 2025

(54) METHOD, APPARATUS FOR PURGING DATA FINGERPRINT AND ELECTRONIC DEVICE, STORAGE MEDIUM

(71) Applicant: New H3C Cloud Technologies Co., Ltd., Chengdu (CN)

(72) Inventor: Peilin Mao, Beijing (CN)

(73) Assignee: New H3C Cloud Technologies Co., Ltd., Chengdu (CN)

( * ) Notice: Subject to any disclaimer, the term of this patent is extended or adjusted under 35 U.S.C. 154(b) by 0 days.

(21) Appl. No.: 18/939,942

(22) Filed: Nov. 7, 2024

(65) Prior Publication Data
US 2025/0200015 A1 Jun. 19, 2025

(30) Foreign Application Priority Data

Dec. 14, 2023 (CN) .......................... 202311717100.1

(51) Int. Cl.
*G06F 16/215* (2019.01)
(52) U.S. Cl.
CPC .................. *G06F 16/215* (2019.01)
(58) Field of Classification Search
CPC .................................................... G06F 16/215
USPC ....................................................... 707/692
See application file for complete search history.

(56) References Cited

U.S. PATENT DOCUMENTS

| | | | | |
|---|---|---|---|---|
| 10,282,256 | B1 * | 5/2019 | Patil ................... | G06F 16/1748 |
| 11,537,573 | B2 * | 12/2022 | Ghanbari ............. | G06F 16/215 |
| 11,755,419 | B2 * | 9/2023 | Ainscow ............. | G06F 11/1469 |
| | | | | 711/162 |
| 2012/0158670 | A1 * | 6/2012 | Sharma ............... | G06F 16/1748 |
| | | | | 707/E17.007 |
| 2017/0091232 | A1 | 3/2017 | Ghanbari et al. | |
| 2023/0086414 | A1 * | 3/2023 | Ghanbari ............ | G06F 16/1748 |
| | | | | 707/692 |

FOREIGN PATENT DOCUMENTS

WO 2021022274 A1 2/2021

OTHER PUBLICATIONS

European Patent Office, Extended European Search Report Issued in Application No. 24211497.3, Mar. 13, 2025, Germany, 10 pages.
Anonymous: "Understanding Database Snapshots", Sep. 21, 2023 (Sep. 21, 2023), XP093255801, 10 pages.

* cited by examiner

*Primary Examiner* — Cam Linh T Nguyen
(74) *Attorney, Agent, or Firm* — GREENBLUM & BERNSTEIN, P.L.C.

(57) ABSTRACT

Disclosed are a method, apparatus, for purging data fingerprint and electronic device. In the method, a storage engine in a distributed storage system may perform a deduplication service suspending process. The storage engine may perform a fingerprint scanning process on a local Redirect-On-Write Database (ROW database) for identifying valid fingerprints in a local fingerprint table, in response to a determination that all storage engines in the distributed storage system completes the deduplication service suspending process. The storage engines may perform a fingerprint purging process for deleting invalid fingerprints from the local fingerprint table after all the storage engines completes the fingerprint scanning process; and may resume deduplication services after all the storage engines complete the fingerprint purging process.

17 Claims, 6 Drawing Sheets

METHOD, APPARATUS FOR PURGING DATA FINGERPRINT AND ELECTRONIC DEVICE, STORAGE MEDIUM

CROSS REFERENCE TO RELATED APPLICATIONS

This application claims priority to Chinese Patent Application No. 202311717100.1, filed on Dec. 14, 2023, the disclosure of which is incorporated herein by reference in its entirety for all purposes.

TECHNICAL FIELD

The present disclosure relates to the field of storage technology, particularly to a method, apparatus purging data fingerprint and electronic device, storage medium.

BACKGROUND

In the field of distributed storage technology, data deduplication technology may reduce the occupancy of storage space and enhance the efficiency of data transmission.

The process of data deduplication may be implemented as follows:

(1) Data to be stored is divided into smaller data blocks.
(2) Fingerprints of the data are calculated. A Hash calculation is performed for each of the data blocks to a unique hash value. The calculated hash values are stored as fingerprints of the data blocks in a hash index table, i.e. a fingerprint table. The hash calculation may be performed using Hash algorithms, such as MD5 algorithm, SHA-1 algorithm, etc. The fingerprints of the data blocks are unique, and the fingerprint table is to be used for rapid comparison of data segment repetition, thereby avoiding the storage of duplicate data.
(3) Prior to storing a new data block, a hash calculation is performed and a fingerprint comparison is performed for the new data block based on the fingerprint table. If the fingerprint of the new data block exists in the fingerprint table, it indicates that an identical data block is already stored in the storage system. To avoid storing duplicate data, a reference counting of the identical data block is stored in the fingerprint table, representing the number of times that the identical data block associated with the fingerprint is referenced in a storage system. Each time the reference counting increases by one, it indicates that a duplicate data deletion is performed. In the present disclosure, the deletion operation performed on duplicate data is referred to as "deduplication", and data that is not actually stored but referenced by fingerprints of stored data is referred to as deduplicated data.
(4) An overwrite operation may be performed on a data block with an existing fingerprint, and the reference counting of the existing fingerprint in the fingerprint table is decremented. In the present disclosure, the process of overwriting deduplicated data blocks is refer to as "deduplicated data overwrite". When a reference counting of a fingerprint drops to zero, the fingerprint is deleted from the fingerprint table, and a data block corresponding to a redirected aggregate address of the fingerprint is marked as garbage data.

In a distributed storage system, fingerprint tables may be stored in a distributed manner. Firstly, a hash value of a fingerprint is calculated using a hash algorithm. Secondly, a virtual node to which the fingerprint belongs is determined based on the hash value. Thirdly, a storage engine to which the fingerprint belongs is determined based on an identifier of the virtual node. In related art, when a deduplicated data overwrite occurs, messages need to be transmitted from a storage engine where the overwrite occurs to the storage engine to which the fingerprint belongs, to update a reference counting of the fingerprint. When a large amount of deduplicated data is overwritten, numerous messages are transmitted within the distributed storage system, affecting the overall performance of the distributed storage system.

SUMMARY

Examples of the present disclosure provide a method, apparatus, and equipment for purging data fingerprint, so as to improve the efficiency of purging fingerprints in a distributed storage system.

In some examples of the present disclosure, a method for purging data fingerprint applied to a storage engine in a distributed storage system is provided, the method comprises a fingerprint purging procedure performed by the storage engine under a synchronized control of a master node, the fingerprint purging procedure for the storage engine including:
  performing a deduplication service suspending process;
  performing a fingerprint scanning process on a local Redirect-On-Write (ROW) database for identifying valid fingerprints in a local fingerprint table, in response to a determination that all storage engines in the distributed storage system complete the deduplication service suspending process;
  performing a fingerprint purging process for deleting invalid fingerprints from the local fingerprint table after all the storage engines complete the fingerprint scanning process;
  resuming deduplication services after all the storage engines complete the fingerprint purging process.

In some examples of the present disclosure, the fingerprint scanning process for identifying valid fingerprints in the local fingerprint table further includes:
  identifying a fingerprint referenced by the local ROW database as a valid fingerprint by traversing the local ROW database;
  sending the identified valid fingerprint to another storage engine to which the identified valid fingerprint belongs;
  receiving a plurality of valid fingerprints belonging to the storage engine; and identifying which fingerprint among all fingerprints belonging to the storage engine is valid.

In some examples of the present disclosure, the ROW database is a key-value database for persisting a redirection aggregation mapping relationship between a small I/O data write and a large I/O data write;
  a fingerprint referenced by the ROW database is a referenced fingerprint in a value field of a deduplication-type.

In some examples of the present disclosure, the identifying which fingerprint among all fingerprints belonging to the storage engine is valid includes:
  generating a fingerprint validity bitmap based on the received valid fingerprints, and using the fingerprint validity bitmap to identify a local valid fingerprint among all fingerprints belonging to the storage engine;
  where each binary bit in the fingerprint validity bitmap corresponds to a fingerprint that belongs to the storage engine; a fingerprint corresponding to a binary bit 1 is valid; a fingerprint corresponding to a binary bit 0 is invalid.

In some examples of the present disclosure, the performing a fingerprint purging process for deleting invalid fingerprints from the local fingerprint table includes: traversing the local fingerprint table; and deleting each fingerprint marked as invalid corresponding to a binary bit 0 in the fingerprint validity bitmap of the local fingerprint table.

The performing a fingerprint purging process for deleting invalid fingerprints from the local fingerprint table includes: traversing the local fingerprint table; and deleting each fingerprint marked as invalid corresponding to a binary bit 0 in the fingerprint validity bitmap of the local fingerprint table.

In some examples of the present disclosure, prior to the generating a fingerprint validity bitmap, the method further includes: persisting the received valid fingerprints into a fingerprint reference table, which is used to recover the fingerprint validity bitmap in case of power failure.

In some examples of the present disclosure, triggering, by the storage engine, the master node to instruct each of all the storage engines to perform the fingerprint purging procedure includes:
determining, by the storage engine, a deduplication data overwrite counting value since a last fingerprint purging procedure is perform by a node to which the storage engine belongs; and sending the deduplication overwrite counting value to the master node;
receiving, by the master node, deduplication data overwrite counting values sent by all of the storage engines, summing up the deduplication overwrite counting values, and triggering the master node to instruct each of all the storage engines to perform the fingerprint purging procedure in response to a determination that a sum of the deduplication overwrite counting values reaches or exceeds a preset watermark value.

In some examples of the present disclosure, the deduplication data overwrite counting value determined by the storage engine is persisted in this storage engine in response to a determination that the deduplication overwrite counting value determined by the storage engine reaches or exceeds an integer multiple of a preset persistence threshold value.

In some examples of the present disclosure, states of all the storage engines in the distributed storage system during performing the fingerprint purging procedure are synchronized by the master node based on a fingerprint purging state machine.

In some examples of the present disclosure, a non-transitory machine-readable storage medium is provided, wherein the non-transitory machine-readable storage medium stores machine-executable instructions to be invoked and executed by a processor to cause the processor to perform the aforementioned data fingerprint purging method.

An electronic device is provided in this disclosure comprising a processor, a communication interface, a storage and a communication bus, wherein the processor, the communication interface, the storage are intercommunicated via the communication bus; the storage is to store machine-executable instructions; the processor is to execute the machine-executable instructions to cause a storage engine in a distributed storage system to perform a fingerprint purging procedure under a synchronized control of a master node, wherein the fingerprint purging procedure comprises operations comprising: performing a deduplication service suspending process; performing a fingerprint scanning process on a local Redirect-On-Write (ROW) database, for identifying valid fingerprints in a local fingerprint table, in response to a determination that all storage engines in the distributed storage system complete the deduplication service suspending process; performing a fingerprint purging process for deleting invalid fingerprints from the local fingerprint table after all storage engines complete the fingerprint scanning process; resuming deduplication services after all the storage engines complete the fingerprint purging process.

Based on the improved fingerprint purging mechanism provided in the present disclosure, the performance degradation caused by maintaining fingerprint reference counting values during extensive deduplication overwrite operations is avoided. Additionally, it resolves the issue of slow compacting in key-value databases when maintaining these counting values, which can lead to write stalls.

BRIEF DESCRIPTION OF DRAWINGS

In order to provide a clearer explanation of the technical solutions of the examples of the present disclosure or in the related art, brief introduction will be made to the accompanying drawings used in the examples of the present disclosure or the related art. The drawings described in the following are merely some examples of the present disclosure. For those of ordinary skills in the art, other drawings may also be obtained based on these drawings of the examples of the present disclosure.

DETAILED DESCRIPTION

Figure 1:
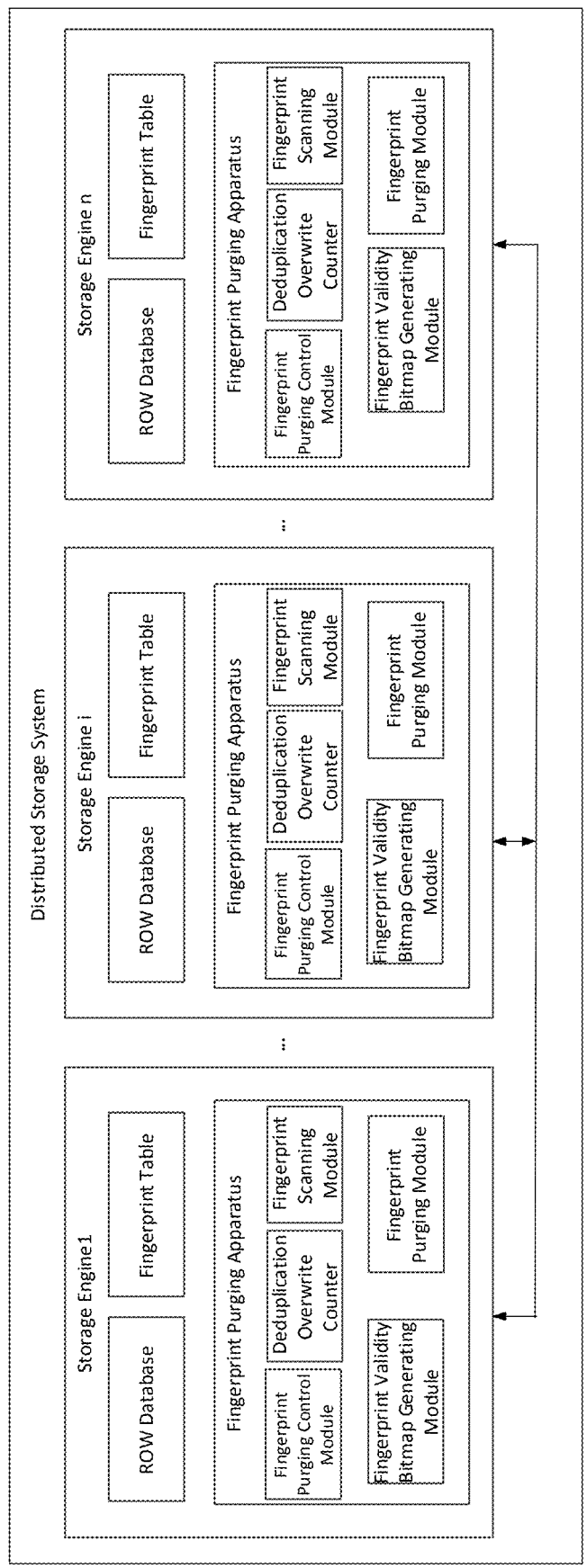
FIG. 1 is a block diagram illustrating multiple modules for fingerprint purging within storage engines of a distributed storage system in accordance with an example of the present disclosure.

When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are further intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

Rocks DB is a key-value database that employs a high-performance, persistent key-value storage engine. Rocks DB is built upon Level DB and may be used for scenarios requiring rapid storage and large-scale data retrieval. Rocks DB is to provide high-performance local storage services, usually in various cloud computing, big data analysis, and distributed systems. Rocks DB, with high write and read performance, may support millions of read and write operations per second. Rocks DB adopts a Log-Structured Merge-tree (LSM) storage engine and supports concurrent read and write operations. Other key-value databases similar to Rocks DB include Hyper Level DB, Wired Tiger, etc. The key-value database mentioned in the embodiments of the present disclosure can be Rocks DB or another database with a storage engine similar to that of Rocks DB. The following examples are described using Rocks DB, but this does not imply that the present disclosure is limited to using a specific key-value database.

In a distributed storage system that heavily utilize SSDs, in order to convert random small Input/Output (I/O) data writes into sequential large I/O data writes, the small I/O data writes are aggregated into the large I/O data writes using a key-value database (e.g., Rocks DB) to persistently store redirection mapping relationships between the small I/O data writes and the large I/O data writes in a distributed manner. In some examples, whether an I/O data write is large or small is depending on a preset value according to the system requirements, if the size of an I/O data write is larger than the preset value, the I/O data write is a large I/O data write; if not, the I/O data write is a small I/O data write. For example, the preset value may be 128 KB or 256 KB. In some examples of the present disclosure, a key-value database, employing the Redirect-On-Write technique to record the redirection aggregation mapping relationships, is referred to as a Redirect-On-Write Database (ROW database). The ROW database is to record which large I/O data block on the storage engine a small I/O data write is mapped to, and this redirection aggregation mapping information is persisted as metadata.

In Redirect-On-Write Database (ROW database), a key (i.e., keyword, referred to as the key) is related to user objects, and a value corresponding to the key is a data fingerprint or an address of a new aggregated object. Since ROW database does not support modification of semantics and uses an append-write mode for new records, a deduplicated data overwrite is to be identified during compaction operations in such databases. During the compaction operations, for the same key, a new value is stored while an old value is deleted. In response to a determination that a deduplicated data overwrite is identified, processes for data compression and fingerprint data purging are performed using reference counting in the distributed storage system. To ensure the accuracy of the fingerprint reference counting, operations for replacing the old value with the new value return after a new fingerprint reference counting is persisted. This causes compaction operations to be slow, potentially leading to a database write stall in severe cases. However, since fingerprint tables imply a key-value database, extensive deduplicated data overwrites may lead to frequent compaction operations, further affecting the performance of the distributed storage system.

Based on the above analyses, the present disclosure provides a new data fingerprint purging solution to avoid the low storage performance caused by fingerprint reference counting and invalid fingerprint purging. In the present disclosure, instead of maintaining a reference counting for each fingerprint, a fingerprint purging procedure is triggered based on a preset cycle or a preset condition. In the present disclosure, while the deduplication service is suspended during a fingerprint purging procedure, a global fingerprint scanning is performed on the ROW database, invalid fingerprints within the fingerprint tables are identified and removed. In the present disclosure, fingerprint purging mechanisms are improved to enhance the performance of a distributed storage system.

In the following examples provided by the present disclosure, processes shown in the flowchart diagrams can be executed by a computer that stores a set of computer-executable instructions. Furthermore, the processes in the flowchart diagrams can be executed in a different sequence.

FIG. 1 is a block diagram illustrating multiple modules for fingerprint purging within storage engines of a distributed storage system in accordance with an example of the present disclosure. In a distributed storage system, data is distributed stored across different physical nodes. By using a hash algorithm, a key of the data is mapped to a virtual node, which is then mapped to a specific physical node, ensuring an even distribution of data among physical nodes and improving system performance and scalability. A storage engine is a collection of virtual nodes and serves as a basic unit for executing I/O and fingerprint purging on a physical node. The storage engine may enhance the availability of the distributed storage system; storage engines on a failed physical node is migrated to other physical nodes to continue operating. When the distributed storage system undergoes scaling, mapping relationships between some virtual nodes and storage engines may change, storage engines on a new physical node may conduct services of the virtual nodes. When data is written into the distributed storage system, fingerprints of the data blocks of the data are stored on corresponding storage engines based on mapping relationships between hash values and storage engines. Each fingerprint belongs to one storage engine, a storage engine on which deduplication occurs may differ from a storage engine to which the fingerprint belongs, and may reside on different physical nodes in the distributed system.

In the distributed system provided in the present disclosure, each storage engine may include a fingerprint table, a ROW database, and one fingerprint purging apparatus.

The fingerprint table is to store a mapping relationship between fingerprints and data blocks. Based on improved finger purging mechanisms provided in the present disclosure, the structure of the fingerprint table is improved accordingly without storing fingerprint reference counting. In some examples of the present disclosure, the fingerprint table at least includes a fingerprint field, and a data block address field. In the present disclosure, the fingerprint table is not limited to a specific structure, and may be realized by a hash linked list structure or a tree structure such as a red-black tree. In one example of the present disclosure, a fingerprint validity bitmap is used to indicate fingerprints in a fingerprint table as valid or invalid in the current storage system.

In the distributed storage systems, the fingerprint tables are distributed on each of the storage engines. Based on a value space of each fingerprint, data fingerprints of a large number of data blocks are evenly distributed across different storage engines, with each fingerprint belonging to one of the storage engines.

In the present disclosure, fingerprint reference counting is deleted from the fingerprint tables and is no longer used for purging invalid fingerprints in the fingerprint tables. Therefore, there is no need to update a fingerprint reference counting by transmitting messages from a storage engine where overwrite occurs to a storage engine which a fingerprint belongs to.

A Redirect-On-Write Database (ROW database) is used for persisting a redirecting aggregation mapping relationship between a small I/O data write and a large I/O data write.

In an example of the present disclosure, the ROW database employs a key-value database (e.g., Rocks DB), in which a key field describes I/O information of a user object, and a value field records a mapping type, which includes at least a redirect-write type and a deduplication type. A value field of the redirect-write type records I/O information of an aggregated object, such as new aggregated object address; a value field of the deduplication type records fingerprint information, e.g., a fingerprint index.

Each of all the storage engines in the distributed storage system may receive a new I/O write request, and split write data into a plurality of small data blocks based on a preset data block size. For each small data block, a fingerprint is calculated based on a hash algorithm, a node which the fingerprint belongs to is determined based on a hash value, and a fingerprint table on a storage engine which the fingerprint belongs to is searched.

For each small data block, it is referred to as duplicated data to be deduplicated in response to a determination that the fingerprint corresponding to the small data block is found in the fingerprint table. A redirecting aggregation write is no need to be performed. In the ROW database, a metadata is recorded to establish a reference correspondence between I/O information of a user object and a referenced data block. In the ROW database, a key-value pair is established, a type of a value field of the key-value pair represents a deduplication type, and the fingerprint of the referenced data block is stored in the value field.

For each small data block, a redirect-aggregate write is to be performed in response to a determination that the fingerprint corresponding to the small data block is not found in the fingerprint table. In the ROW database, a key-value pair is established, a type of a value field of the key-value pair represents a redirect-write type, and an address of a redirect-aggregated data block is stored in the value field.

In response to a determination of that a number of newly written key-value pairs in the ROW database reaches a preset threshold value, a compaction mechanism is triggered for compacting key-value pairs in the ROW database. Key-value pairs in the ROW database are sorted. Multiple Key-value pairs with a same key in the ROW database are grouped together, and then the multiple key-value pairs with the same key are traversed over. In the multiple key-value pairs with the same key, if a type of a value field of a previous key-value pair is a non-deduplication type and a type of a value field of a subsequent key-value pair is a deduplication type, it is determined that a deduplicated data overwrite, i.e. called deduplication overwrite, occurs.

In the distributed storage system, a fingerprint purging apparatus is to perform a fingerprint purging procedure with other storage engines. In the distributed storage system, each storage engine is equipped with a fingerprint purging apparatus. Under a synchronized control of a fingerprint purging apparatus in a master node, the fingerprint purging procedure performed by the fingerprint purging apparatus on each storage engine may include a deduplication service suspending process, a fingerprint scanning process, a fingerprint purging process, and a deduplication service recovering process.

In the distributed storage system, a fingerprint purging control module is to exchange information with other fingerprint purging control modules located on the other storage engines. Under a synchronous control of a fingerprint purging control module of the master node, the fingerprint purging control modules of all the nodes may coordinate states during the fingerprint purging procedure, synchronously perform the fingerprint purging procedure, and enable or disable a deduplication service at an initial stage and an end stage of the fingerprint purging procedure.

In some examples of the present disclosure, the fingerprint purging procedure is collaboratively performed by each of the storage engines in the distributed storage system. Multiple storage engines may elect a master storage engine (a node where the master storage engine is located is referred to as a master node), to be responsible for coordinating the fingerprint purging procedure and maintaining states of each of all the storage engines during the fingerprint purging procedure. The fingerprint purging control module of the master node is a primary fingerprint purging control module, the fingerprint purging control modules in other storage engines are secondary fingerprint purging control modules. The primary fingerprint purging control module and the secondary fingerprint purging control modules may exchange information for coordinating states of each of all the storage engines and synchronously performing each process in the fingerprint purging procedure.

Figure 2:
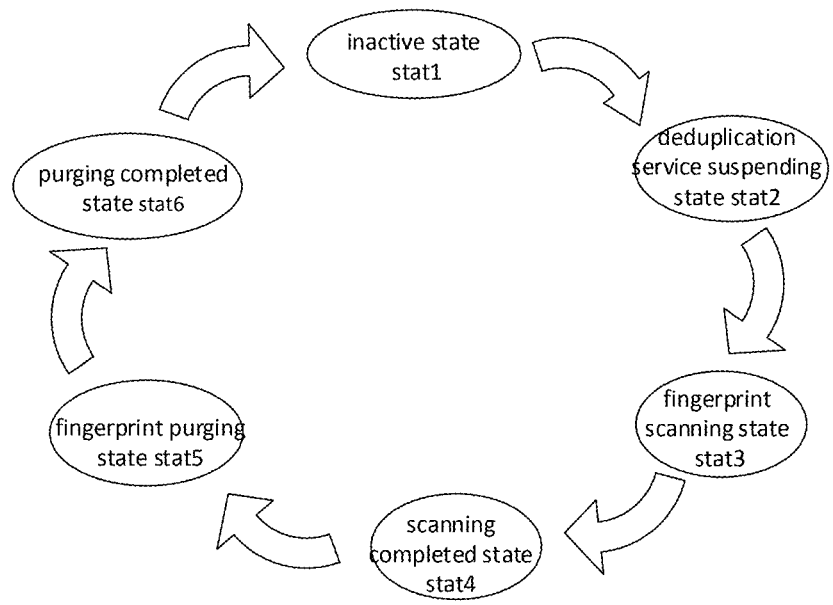
FIG. 2 is a schematic diagram illustrating state transition of a state machine related to multiple modules for fingerprint purging in accordance with an example of the present disclosure.

FIG. 2 is a flow diagram illustrating state transition of a state machine related to multiple fingerprint purging control modules in accordance with an example of the present disclosure. Each process of the fingerprint purging procedure is performed based on a fingerprint purging state machine in the fingerprint purging control modules. The primary fingerprint purging control module and the secondary fingerprint purging control modules may exchange information for interacting state information. Each node may complete the fingerprint purging procedure in a coordinated manner under the control of the fingerprint purging state machines. States of the fingerprint purging state machine on each storage engine are as follows:

An inactive state, stat1, is an initial state indicating that conditions for performing the fingerprint purging procedure are not yet met and the fingerprint purging procedure is inactive.

A deduplication service suspending state, stat2, is a state that is the first state entered during the fingerprint purging procedure. The deduplication service suspending state indicates that the deduplication services based on data fingerprints in the distributed storage system are shut down temporarily and will be re-enabled after the fingerprint purging procedure is completed.

A fingerprint scanning state, stat3, is a state in which all the storage engines suspend the deduplication services and enter the fingerprint scanning state under the control of the master storage engine. The fingerprint scanning state indicates that each storage engine may perform the fingerprint scanning process to find valid fingerprints stored in the key-value pairs with the deduplication type in its respective ROW database, and may send the found valid fingerprints to the storage engines to which the found valid fingerprints belong.

A scanning completed state, stat4, is a state indicating that each storage engine completes its fingerprint scanning process. After completing the fingerprint scanning process on the node where each storage engine is located, each storage engine may send a scanning completed state information to the master node and enter the scanning completed state.

A fingerprint purging state, stat5, is a state where, after all the storage engines complete the fingerprint scanning process, under the control of the master node, all the storage engines enters the fingerprint purging state. In the fingerprint purging state, each storage engine is performing the fingerprint purging process to remove invalid fingerprints from the fingerprint table on the node which each storage engine is located.

A purging completed state, stat6, is a state indicating that each storage engine complete the fingerprint purging processes. After completing the fingerprint purging process on the node which each storage engine is located, each storage engine may send a purging completed state information to the master node and may enter the purging completed state.

After enter the purging completed state, each of all the storage engines is to be instructed by the master node, through information commands, to re-enable the deduplication service and to re-enter the inactive state.

A deduplication overwrite counter is used to determine a deduplication overwrite counting value of a node after a last fingerprint purging procedure is performed by the node where the deduplication overwrite counter is located, and to send the deduplication overwrite counting value to the primary fingerprint purging control module of the master node.

Each storage engine may maintain one deduplication overwrite counter to record a number of times that deduplicated data overwrite operations occurred on the storage engine. A deduplication overwrite counting value maintained by each deduplication overwrite counter is reset to zero each time after the fingerprint purging process is completed.

For any of the storage engines in the distributed storage system, when one deduplicated data overwrite operation is detected on its node, the deduplication overwrite counting value is incremented by 1. To prevent the deduplication overwrite counting value being lost in a faulty state, a persistence can be performed when the deduplication overwrite counting value reaches or exceeds an integer multiple of a preset persistence threshold value for the deduplication overwrite counting value.

Each of all the storage engines may send its own the deduplication overwrite counting value to the primary fingerprint purging control module of the master node based on a unified configuration. The primary fingerprint purging control module sums the deduplication overwrite counting values sent by each storage engine and makes a judgment on whether to trigger the fingerprint purging processes. Each storage engine may reports its deduplication overwrite counting value to the master node based on a request from the master node or at predetermined intervals. The present disclosure does not limit a specific reporting strategy.

The fingerprint scanning module is to perform the fingerprint scanning process based on a fingerprint scanning message sent by the primary fingerprint purging control module of the master node (forwarded by the local fingerprint purging control module in the case of a non-master node), traverse the local ROW database, and send scanned valid fingerprints to storage engines to which the scanned valid fingerprints belong through fingerprint reference messages.

A fingerprint validity bitmap generation module is to receive fingerprint reference messages sent by each of all the storage engines including the storage engine itself), generate a fingerprint validity bitmap based on fingerprints carried in the fingerprint reference messages, and identify which fingerprint among all fingerprints belonging to the storage engine is valid through the fingerprint validity bitmap. In a fingerprint validity bitmap, each binary bit corresponds to one fingerprint in the fingerprint table. The fingerprints in the local fingerprint table whether are validly referenced by deduplication-type key-value pairs in the ROW database on local or other storage engines, can be identified.

A fingerprint purging module is to perform the fingerprint purging process of the storage engine where the fingerprint purging module is located based on a fingerprint purging message sent by the primary fingerprint purging control module of the master node (forwarded by the local fingerprint purging control module in the case of a non-master node). During the fingerprint purging process, fingerprint records marked as invalid are deleted from the fingerprint table based on the fingerprint validity bitmap.

Triggering the Fingerprint Purging Procedure

In an example of the present disclosure, invalid fingerprints stored in storage engines of a distributed storage system are purged centrally. After determining that a trigger condition for performing the fingerprint purging procedure is met, a fingerprint purging control module of a master node may instruct all the storage engines to perform the fingerprint purging procedure through command messages. The master node may be triggered to instruct each storage engine to perform the fingerprint purging procedure in different ways as follows:

In an example of the present disclosure, a conditional triggering strategy is provided. Based on a preset reporting strategy, each storage engine may send the deduplication overwrite counting value of the node where it is located to the primary fingerprint purging control module. The primary fingerprint purging control module may sum up the deduplication overwrite counting values sent by each storage engine and determine whether a sum of the deduplication overwrite counting values reaches or exceeds a preset watermark value. In response to a determination that the sum of the deduplication overwrite counting values reaches or exceeds the preset watermark value, the primary fingerprint purging control module of the master node may be triggered to instruct each of all the storage engines to perform the fingerprint purging procedure.

The watermark value may be determined based on a capacity of the fingerprint table. For example, through testing in traffic scenarios, when the total deduplication overwrite counting value reaches or exceeds half of the fingerprint table capacity, it will significantly affect the performance of the overall storage system. The watermark value may be set to half of the capacity of the fingerprint tables. The capacity of each fingerprint table may be calculated as a preset proportion of a memory capacity of the storage engines when deploying the storage cluster, for example, the capacity of the fingerprint tables may be taken as 15% of a total memory capacity.

In an example of the present disclosure, a periodic triggering strategy is provided. The primary fingerprint purging control module may periodically trigger each storage engine to perform the fingerprint purging procedure based on a preset fingerprint purging cycle. For example, a time duration with the lowest traffic is selected for triggering the fingerprint purging procedure every 30 days. Base on the periodic triggering strategy, each storage engine may not calculate its deduplication overwrite counting value.

In an example of the present disclosure, a hybrid triggering strategy combing both the conditional triggering strategy and the periodic triggering strategy is provided. In response to a determination that any one of the above triggering strategies is met, the master node is triggered to instruct each storage engine to perform the fingerprint purging procedure.

Figure 3:
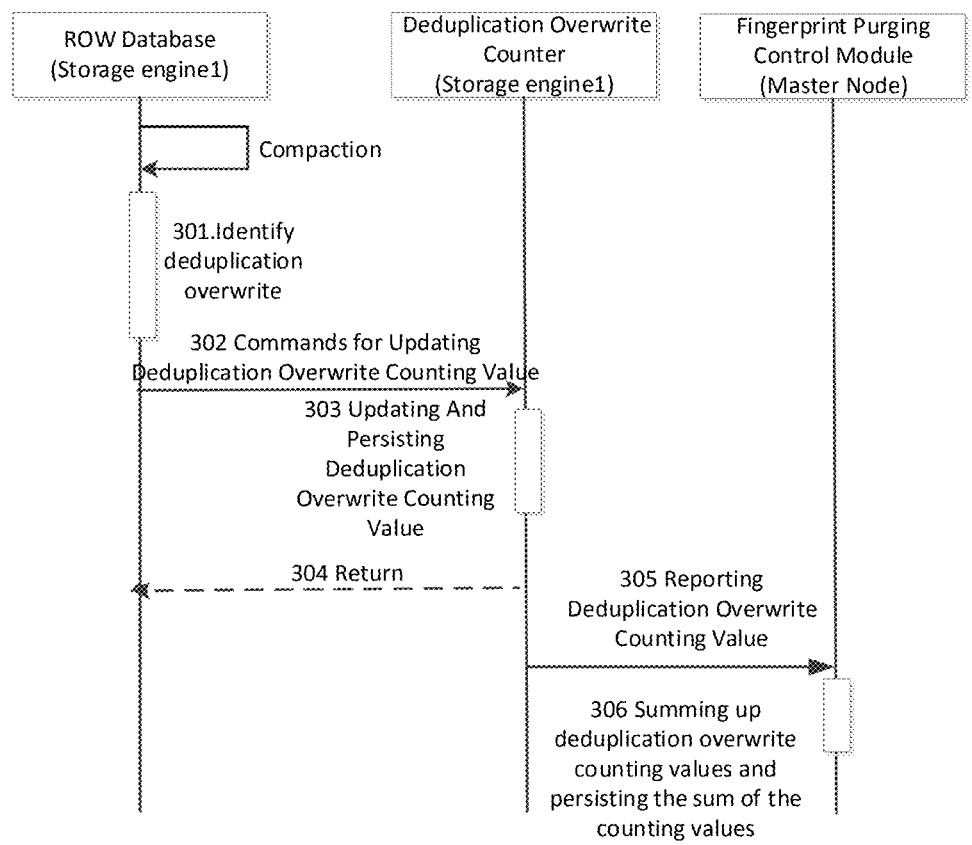
FIG. 3 is a schematic diagram illustrating a process of performing deduplication overwrite counting in accordance with an example in accordance with an example of the present disclosure.

FIG. 3 is a schematic diagram illustrating a process of performing deduplication overwrite counting in accordance with an example of the present disclosure. Taking a storage engine 1 as an example, a process of the storage engine 1 updating its deduplication overwrite counting value may be as follows:

In process 301, a ROW database of the storage engine 1 may identify a deduplicated data overwrite occurs during implementing a compaction operation, based on the previously described process for identifying a duplicated data overwrite occurs in the description of the ROW database.

In process 302, the ROW database of the storage engine 1 sends a number of deduplication overwrite identified during the compaction operation to a deduplication overwrite counter in the storage engine 1 by executing an interface call.

In process 303, the deduplication overwrite counter in the storage engine 1 updates a deduplication overwrite counting value, determines the deduplication overwrite counting value reaches or exceeds a preset persistence threshold value, persist the deduplication overwrite counting value as a local deduplication overwrite counting value.

In process 304, after updating a deduplication overwrite counting value, the deduplication overwrite counter returns an update result to the ROW database to notify that an update operation is completed.

In process 305, the storage engine 1 reports the deduplication overwrite counting value to the primary fingerprint purging control module of the master node. The storage engine 1 may be the master node or a non-master node, and each storage engine may send its deduplication overwrite counting value to the primary fingerprint purging control module of the master node.

Figure 4:
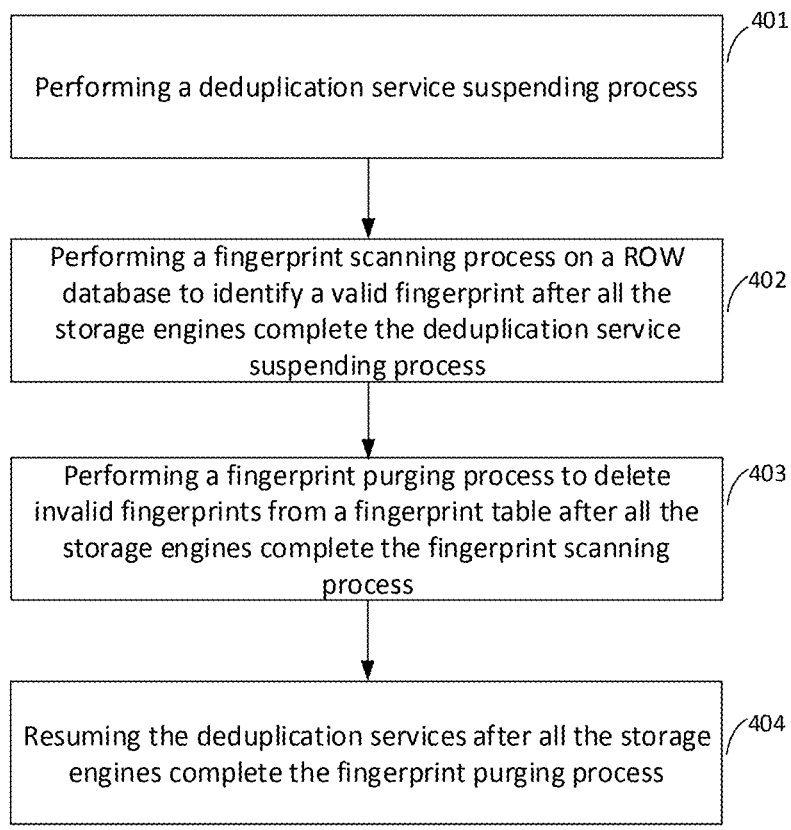
FIG. 4 is a flow chart diagram illustrating a process of fingerprint purging performed by storage engines in accordance with an example of the present disclosure.

FIG. 4 is a flow chart diagram illustrating processes of a fingerprint purging procedure performed by storage engines in accordance with an example of the present disclosure. Taking the storage engine 1 as an example, the storage engine 1 under a synchronous control of the master node may perform the fingerprint purging procedure as follows:

In process 401, a deduplication service suspending process is performed.

The primary fingerprint purging control module of the master node is responsible for overall controlling fingerprint purging states of each storage engine and coordinating each process of the fingerprint purging procedure is performed.

At the beginning of the fingerprint purging procedure, deduplication services run by the storage engines on the nodes, including the master node, are suspended. So that the storage engines may shut down duplicate data deletion services based on fingerprint, but continue to provide storage services without affecting operation of normal services. Since the deduplication services are shut down, the storage engines may not provide deduplication features. This ensures the stability of data stored the ROW database, preventing new deduplication metadata from being generated during the fingerprint purging procedure.

In process 402, a fingerprint scanning process is performed on a ROW database to identify a valid fingerprint in the fingerprint table after all the storage engines complete the deduplication service suspending process.

In a distributed storage system, after all storage engines suspend the deduplication services, new deduplication metadata can be avoided in a ROW database of any storage engine. Therefore, the master node needs to coordinate that all the storage engines suspend the deduplication services, then the storage engine 1 begins to perform the fingerprint scanning process.

In process 403, a fingerprint purging process is performed to delete invalid fingerprints from a fingerprint table after all the storage engines complete the fingerprint scanning process;

In a distributed storage system, after all storage engines complete the fingerprint scanning process, fingerprints that are currently validly referenced in the ROW database on a global scale are identified with assurance. Therefore, the master node needs to coordinate that all the storage engines complete the fingerprint scanning process, then the storage engine 1 begins to perform the fingerprint purging process.

With performing the fingerprint scanning process, each storage engine finds valid fingerprints belonging to other storage engines, and send each of all the found valid fingerprints to the storage engine which it belongs to. This ensures that each storage engine can identify valid fingerprints in its own fingerprint table. In the fingerprint table of each storage engine, the remaining fingerprints are invalid after the valid fingerprints are identified by each storage engine.

In process 404, the deduplication services are resumed after all the storage engines complete the fingerprint purging process.

After all storage engines complete the fingerprint purging process, all nodes reach a synchronized state of completing the fingerprint purging process. The master node may coordinate all the storage engines to re-enable the deduplication services provided by all the nodes.

Figure 5:
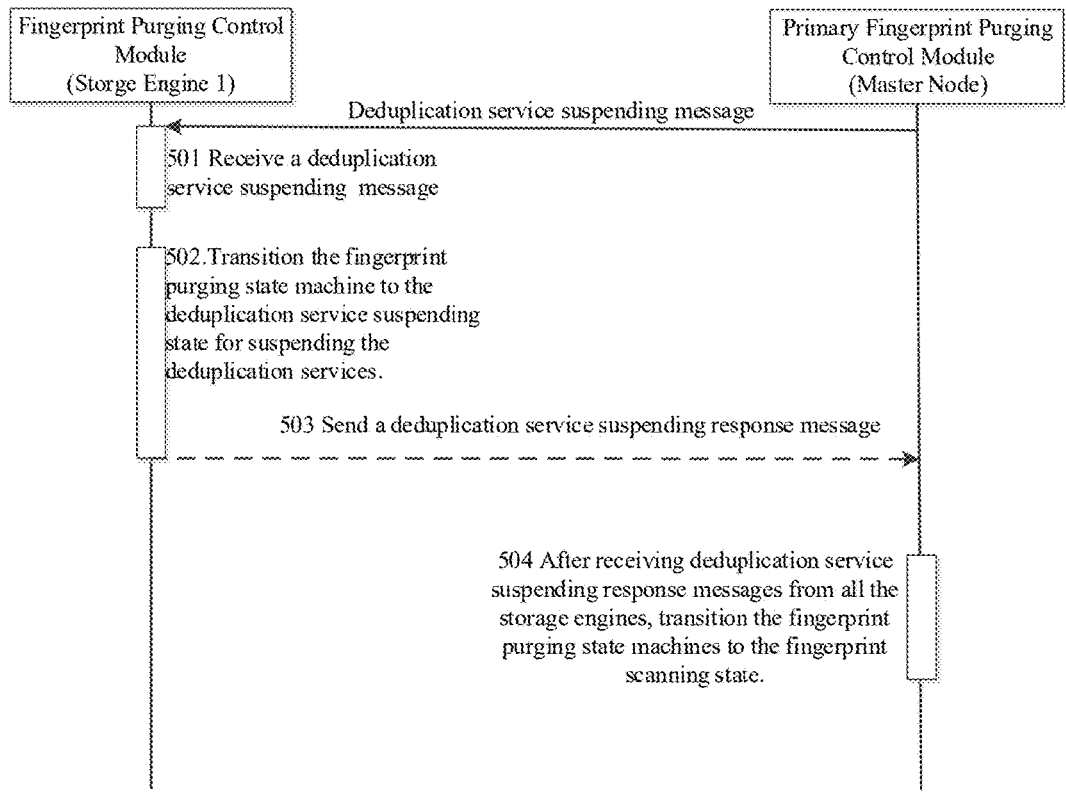
FIG. 5 is a flow diagram illustrating a process of suspending deduplication service performed by storage engines in accordance with an example of the present disclosure.

FIG. 5 is a flow diagram illustrating a process of suspending deduplication services performed by storage engines in accordance with an example of the present disclosure. Taking storage engine 1 as an example, under the synchronous control of the master node, the processes for storage engine 1 to execute the suspension of the deduplication service are as follows:

In process 501: a deduplication service suspending message is received from the primary fingerprint purging control module of the master node;

In response to a determination that a trigger condition for initiating the fingerprint purging procedure is met, the primary fingerprint purging control module of the master node sends the deduplication service suspending message to fingerprint purging control modules of all the storage engines to notify all the storage engines to begin performing the fingerprint purging procedure.

In process 502: the fingerprint purging state machine is transitioned to the deduplication service suspending state for suspending the deduplication services;

After receiving the deduplication service suspending message, the storage engine 1 transitions its fingerprint purging state machine to the deduplication service suspending state to suspend its deduplication services.

In process 503, a deduplication service suspending response message is sent to the master node;

After completing the deduplication service suspending process, each storage engine sends the duplication service suspending response message the primary fingerprint purging control module to notify the master node that the deduplication service suspending process is completed.

In process 504, after receiving deduplication service suspending response messages from all the storage engines, the primary fingerprint purging control module transitions all the fingerprint purging state machines to the fingerprint scanning state.

With the storage engine 1 as the master node, the storage engine 1 sends the deduplication service suspending response message to itself. After receiving deduplication service suspending response messages from all the storage engines of the distributed storage system, the primary fingerprint purging control module transitions the fingerprint purging state machine of the storage engine 1 to the fingerprint scanning state. In some examples of the present disclosure, functions of the fingerprint purging state machine in the fingerprint purging control module of each storage engine may be performed by the local storage engine.

Figure 6:
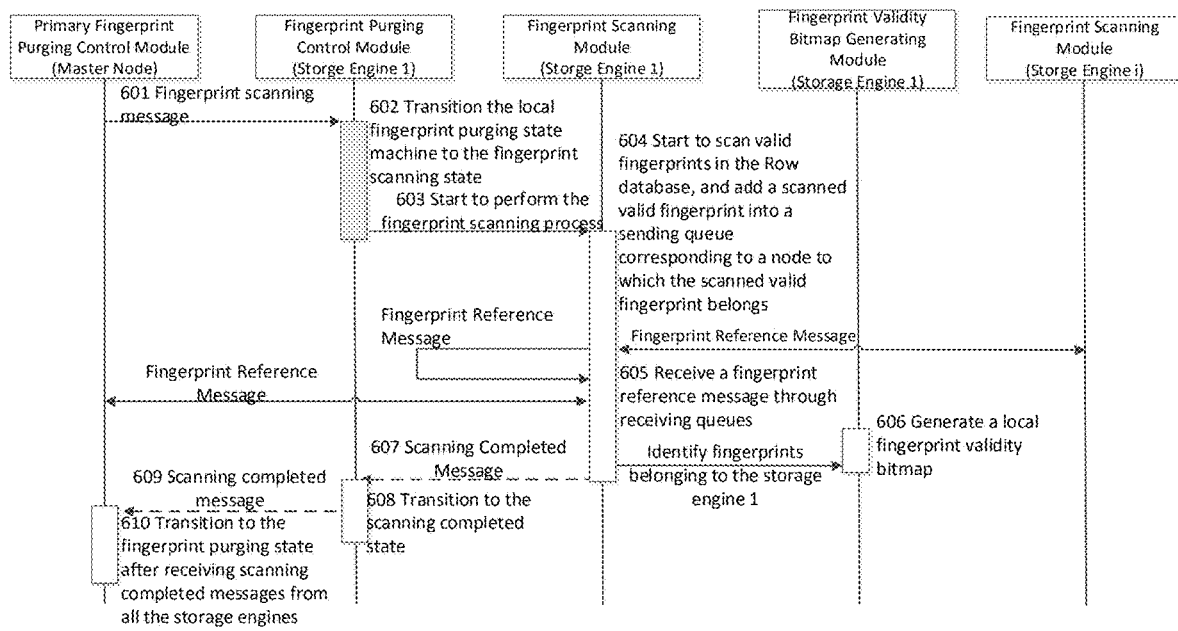
FIG. 6 is a flow diagram illustrating a process of performing fingerprint scanning on a Redirect-On-Write database in accordance with an example of the present disclosure.

FIG. 6 is a flow diagram illustrating a process of performing fingerprint scanning on a ROW database in accordance with an example of the present disclosure. For example, the storage engine 1 is taken as a example for description of a process of a storage engine performing fingerprint scanning to identify valid fingerprints in the fingerprint table under a synchronous control of the master node.

In process 601, a fingerprint purging control module of the storage engine 1 receives a fingerprint scanning message sent by the master node.

After receiving the deduplication service suspending response messages from all the nodes indicating the suspending deduplication service process is complete, the primary fingerprint purging control module of the master node coordinates all the storage engines synchronously performing the fingerprint scanning process by transitioning the fingerprint purging state machines of all the storage engines to the fingerprint scanning state and sending fingerprint scanning messages to all the storage engines.

In process 602, the fingerprint purging control module of the storage engine 1 transitions the local fingerprint purging state machine to the fingerprint scanning state.

In process 603, the fingerprint purging control module of the storage engine 1 instructs the fingerprint scanning module of storage engine 1 to start executing the fingerprint scanning process through an interface.

In process 604, the fingerprint scanning module of the storage engine 1 starts to scan valid fingerprints in the ROW database located on the storage engine 1, and adds a scanned valid fingerprint into a sending queue corresponding to a node to which the scanned valid fingerprint belongs.

Each fingerprint scanning module traverses the ROW database on the storage engine that each fingerprint scanning module belongs to, for example by using an iterator. When finding a key-value pair of a deduplication type, the fingerprint scanning module extracts a fingerprint from a value field of the founded key-value pair, calculates the node that the extracted fingerprint belongs to, and adds the extracted fingerprint into a sending queue corresponding to the calculated node. Each storage engine can correspond to a sending queue. For example, the distributed storage system may include six storage engines; each storage engine is configured with six sending queues, one of which corresponds to itself. Each fingerprint scanning module determines that, when the number of fingerprints in any configured sending queue of its storage engine reaches the sending threshold, each fingerprint scanning module sends the fingerprints from that queue to the target storage engine to which the fingerprints belong, via fingerprint reference messages.

For example, the fingerprint scanning module of the storage engine 1 may find valid fingerprints belonging respectively to the storage engine 1, a storage engine i, and the storage engine located on the master node, add the found valid fingerprints into sending queues that correspond to the storage Engine 1, a storage Engine i, and the storage engine locating on the master node, respectively, and then the fingerprint scanning module of the storage engine 1 may send the found valid fingerprints to these storage engines via these sending queues.

In process 605, the fingerprint scanning module of the storage engine 1 may receive fingerprint reference messages sent by respective storage engines through receiving queues.

In process 606, a fingerprint validity bitmap generation module of the storage engine 1 reads the fingerprint reference messages in the receiving queues in real-time, obtains local valid fingerprints, i.e. valid fingerprints belonging to the storage engine 1, from the fingerprint reference messages, and generates a local fingerprint validity bitmap, i.e., a. fingerprint validity bitmap of the storage engine 1.

In process 607, the fingerprint scanning module of the storage engine 1 sends a scanning completed message to the fingerprint purging control module of the storage engine 1 after completing fingerprint scanning a local ROW database, i.e. the ROW database of the storage engine 1.

In process 608, the fingerprint purging control module of the storage engine 1 transitions the local fingerprint purging state machine to the scanning completed state after receiving the scanning completed message;

In process 609, the fingerprint purging control module of the storage engine 1 sends a scanning completed message to the primary fingerprint purging control module of the master node.

In process 610, the primary fingerprint purging control module of the master node transitions the fingerprint purging state machine of the master node to the fingerprint purging state after receiving scanning completed messages from all the storage engines;

In an example of the present disclosure, to prevent loss of received valid fingerprints caused by to power failures or other malfunctions, a fingerprint scanning module may persist fingerprint reference information carried in the received fingerprint reference messages sent from each storage engine by storing it in a fingerprint reference table. After fault recovery, a fingerprint validity generation module may use the valid fingerprints persisted in the fingerprint reference table to regenerate the fingerprint validity bitmap.

Figure 7:
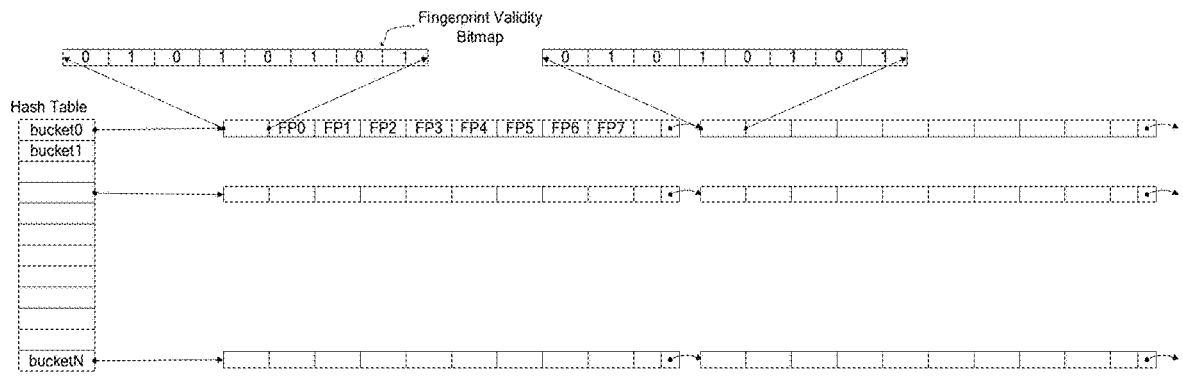
FIG. 7 is a schematic diagram illustrating a structure of a fingerprint table and a fingerprint validity bitmap in accordance with an example of the present disclosure.

FIG. 7 illustrates a structure of a fingerprint table and a fingerprint validity bitmap in accordance with an example of the present disclosure. The fingerprint table illustrated in FIG. 7 adopts a hash linked list structure, in which each bucket of a hash table links multiple structural units in a linked list structure. Each structural unit at least includes a fingerprint validity sub-bitmap at a head and an array storing fingerprints. Each cell in the array stores a fingerprint record, including a fingerprint and a data block address, but no longer includes a reference counting.

Each bit in the validity sub-bitmap corresponds sequentially to a fingerprint in the array. With a binary bit in the fingerprint validity bitmap being 1, it indicates that a fingerprint at the corresponding position in the array is valid; with a binary bit being 0, it indicates that a fingerprint at the corresponding position is invalid. In this example, the fingerprint validity bitmap is equivalently split into multiple sub-bitmaps embedded into a fingerprint table structure, thereby improving the efficiency of fingerprint purging.

Based on the example in FIG. 7, each validity bitmap generation module of each storage engine, to which each validity bitmap generation module belongs, obtains fingerprints from fingerprint reference messages read from the receiving queues, and updates corresponding bits to 1 in the fingerprint validity sub-bitmap within the linked list structure unit of the fingerprint table. In an initial state, all binary bits in the fingerprint validity bitmap is 0, after all storage engines complete the fingerprint scanning process, any fingerprint corresponding to a binary bit not set to 1 in the fingerprint validity bitmap is identified as an invalid fingerprint.

Figure 8:
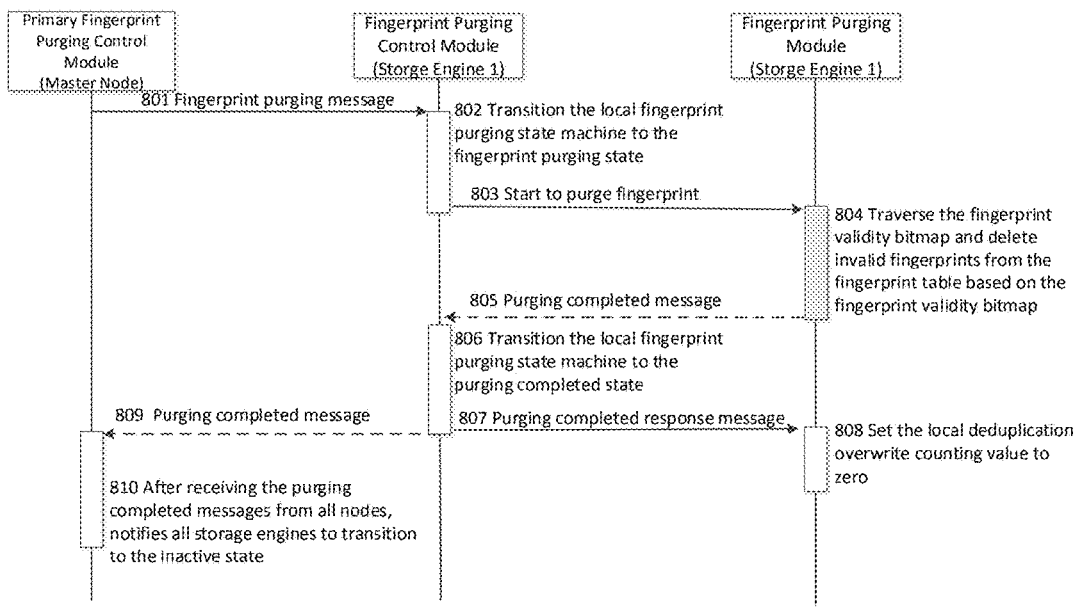
FIG. 8 is a flow chart diagram illustrating a process of performing fingerprint purging in accordance with an example of the present disclosure.

FIG. 8 is a flow chart diagram illustrating a process of performing fingerprint purging in accordance with an example of the present disclosure. Taking the storage engine 1 as an example, the following describes how each storage engine performs the fingerprint purging process under the synchronization control of the master node, thereby removing the invalid fingerprints.

In process 801, the fingerprint purging control module of the storage engine 1 receives a fingerprint purging message sent by the primary fingerprint purging control module of the master node;

In Process 802, the fingerprint purging control module of the storage engine 1 transitions the local state machine to the fingerprint purging state;

after all the storage engines complete the fingerprint scanning process, the fingerprint validity bitmaps of all the storage engines in the storage system are updated. The primary fingerprint purging control module of the master node transitions the fingerprint purging state machine of the master node to the fingerprint purging state and simultaneously sends fingerprint purging messages to all storage engines to notify other storage engines to transition to the fingerprint purging state and start performing the fingerprint purging process.

In process 803, the fingerprint purging control module of the storage engine 1 notifies the fingerprint purging module of the storage engine 1 to start fingerprint purging by calling an interface;

in process 804, the fingerprint purging module of the storage engine 1 traverses the fingerprint validity bitmap and deletes invalid fingerprints from the fingerprint table based on the fingerprint validity bitmap.

During the fingerprint scanning process, each storage engine sets binary bits corresponding to valid fingerprints in the fingerprint validity bitmap to 1. After all the storage engines complete the fingerprint scanning process, fingerprints corresponding to binary bits that are 0 in the fingerprint validity bitmap are identified as invalid fingerprints. During the fingerprint purging process, the fingerprint purging module of each storage engine traverses the fingerprint validity bitmap, extracts invalid fingerprints corresponding to binary bits with a value of 0 in the fingerprint validity bitmap, deletes the invalid fingerprints from the fingerprint table, and simultaneously marks data blocks corresponding to the invalid fingerprints as garbage data for a garbage collection module to recycle.

In process 805, after completing the fingerprint purging, the fingerprint purging module of the storage engine 1 sends a purging completed message to the fingerprint purging control module of the storage engine 1.

In process 806, after receiving the purging completed message, the fingerprint purging control module of the storage engine 1 transitions the local state machine to the purging completed state.

In process 807, the fingerprint purging control module of the storage engine 1 sends a purging completed response message to the local fingerprint purging module.

In process 808, after receiving the purging completed response message, the fingerprint purging module of the storage engine 1 resets the local deduplication overwrite counting value to zero.

In process 809, the fingerprint purging control module of the storage engine 1 sends a purging completed message to the primary fingerprint purging control module of the master node.

In process 810, after receiving the purging completed messages from all nodes, the primary fingerprint purging control module of the master node notifies all storage engines to transition to the inactive state.

After the primary fingerprint purging control module of the master node receives the purging completed messages from all nodes, it indicates that all nodes complete the fingerprint purging process and achieve state consistency. After all nodes complete purging fingerprints, the master node sends an inactive message to notify all storage engines to enter the inactive state. In the present disclosure, the local modules, local ROW databases, or local state machines of storage engines refer to components within the storage engines.

Figure 9:
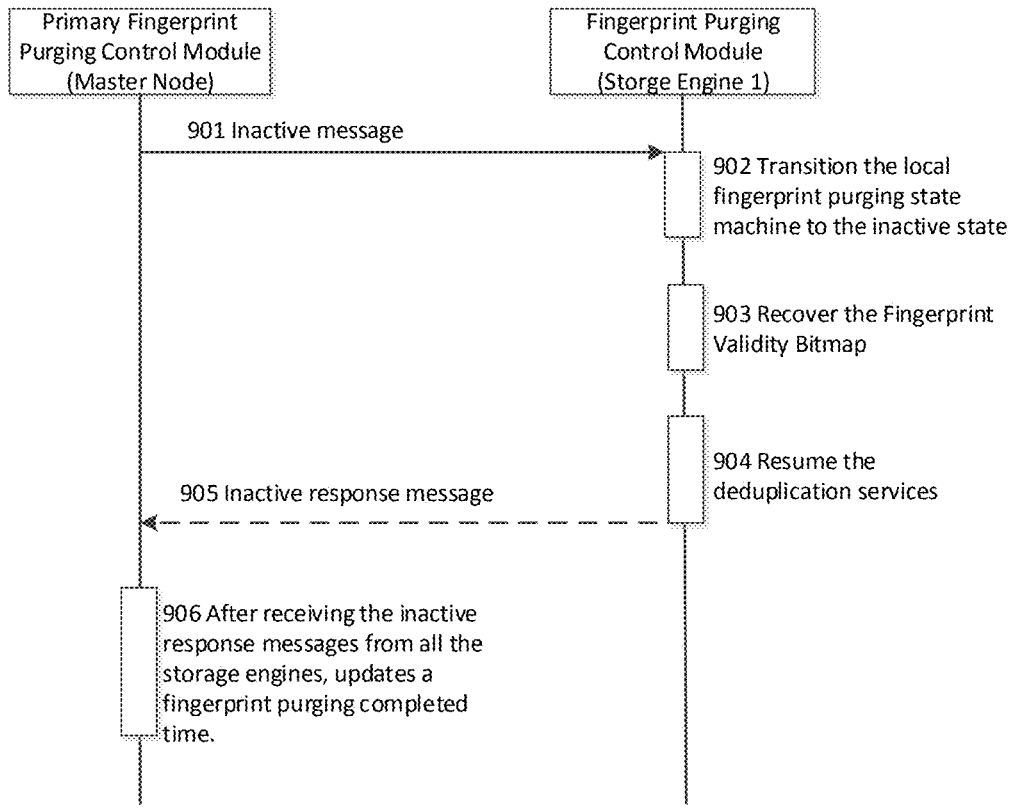
FIG. 9 is a flow chart diagram illustrating a process of a storage engine re-entering an inactive state in accordance with an example of the present disclosure.

[FIG. 9 is a flow chart diagram illustrating a process of a storage engine re-entering an inactive state in accordance with an example of the present disclosure. Taking the storage engine 1 as an example, processes performed by each storage engine to enter the inactive state under the synchronous control of the master node are illustrated:

In process 901, after receiving the purging completed messages from all nodes, the primary fingerprint purging control module of the master node sends inactive messages to all nodes to notify all nodes to enter the inactive state. The fingerprint purging control module of the storage engine 1 receives one of the inactive messages;

In process 902, after receiving the inactive message, the local fingerprint purging control module of the storage engine 1 transitions the local state machine to the inactive state;

In process 903, the local fingerprint purging control module of the storage engine 1 resets all binary bits of the local fingerprint validity bitmap to 0 or notifies the local validity bitmap generation module to reset all binary bits of the local fingerprint validity bitmap to 0.

In process 904, the fingerprint purging control module of the storage engine 1 resumes the deduplication services to re-enable the deduplication services of the storage engine 1.

In process 905, the fingerprint purging control module of the storage engine 1 sends an inactive response message to the primary fingerprint purging control module of the master node;

In process 906, after receiving the inactive response messages from all the storage engines, the primary fingerprint purging control module of the master node confirms that the current fingerprint purging procedure is complete and updates a fingerprint purging completed time.

Figure 10:
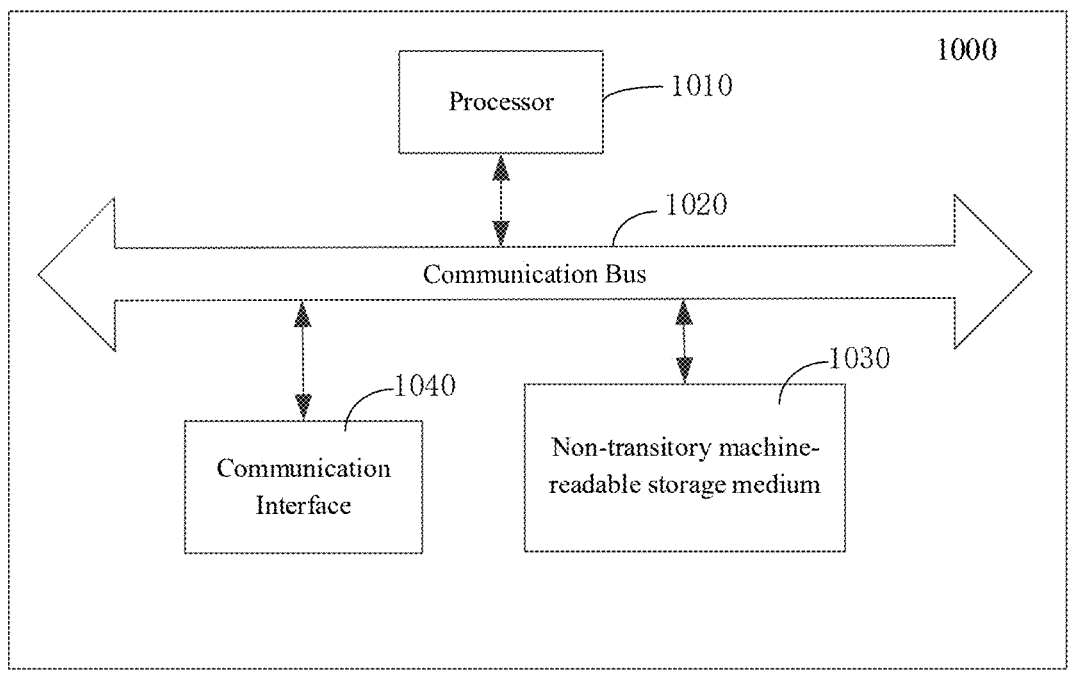
FIG. 10 is a block diagram illustrating an electronic device for data fingerprint purging in accordance with an example of the present disclosure.

FIG. 10 is a block diagram illustrating an electronic device for data fingerprint purging based on with an example of the present disclosure. The device 1000 includes: a processor 1010 such as a Central Processing Unit (CPU), a communication bus 1020, a communication interface 1040, and a memory 1030. The processor 1010 and the memory 1030 can communicate with each other through the communication bus 1020. The memory 1030 stores machine-executable instructions, and when the machine-executable instructions are executed by the processor 1010, the processes in the data fingerprint purging procedure provided in the present disclosure can be implemented, achieving the method for fingerprint data purging.

The Memory refers to a device based on a certain storage medium for storing machine-executable instructions and/or data. It can be a volatile memory (Volatile Memory, VM, often referred to as memory), or a non-volatile memory (Non-Volatile Memory, NVM). The Memory refers to an internal memory that directly exchanges data with the processor. The Memory can be a Synchronous Dynamic Random Access Memory (SDRAM), Dynamic Random Access Memory (DRAM), etc. Non-volatile memory refers to memory using persistent storage media, characterized by large capacity and the ability to persistently store data. It can be Storage Class Memory (SCM), Solid State Disk (SSD), NAND flash memory, magnetic disks, etc. SCM is a general term in the industry for new storage media between memory and flash memory. It is a composite storage technology that combines persistent storage characteristics with memory characteristics. Its access speed is slower than DRAM but faster than SSD hard drives.

The processor can be a general-purpose processor, including a Central Processing Unit (CPU), a Network Processor (NP), etc.; it can also be a Digital Signal Processor (DSP), an Application Specific Integrated Circuit (ASIC), a Field-Programmable Gate Array (FPGA), or other programmable logic devices, discrete gates or transistor logic devices, discrete hardware components.

It should be recognized that embodiments of the present disclosure can be realized or implemented by computer hardware, a combination of hardware and software, or through computer instructions stored in non-transitory (or non-volatile) memory. The methods can be implemented using standard programming techniques, including configuring a non-transitory storage medium with machine-executable instructions, where the so-configured storage medium causes a computer to operate in a specific and predefined manner. Each program can be implemented in a high-level procedural or object-oriented programming language to communicate with a computer system. However, if necessary, the program can be implemented in assembly language or machine language. In any case, the language can be either compiled or interpreted. Furthermore, the program for this purpose can be run on a programmed application-specific integrated circuit. Additionally, the operations of the processes described in the present disclosure can be performed in any suitable order, unless otherwise indicated by the present disclosure or otherwise obviously contradictory to the context. The processes described in the present disclosure (or variations and/or combinations thereof) can be executed under the control of one or more computer systems configured with executable instructions and can be realized as code (e.g., executable instructions, one or more machine-executable instructions, or one or more applications) executed collectively on one or more processors, by hardware, or a combination thereof. The machine-executable instructions include multiple instructions executable by one or more processors.

Furthermore, the methods can be implemented in any type of computing platform operatively connected to suitable devices, including but not limited to personal computers, minicomputers, mainframes, workstations, and networks or distributed computing environments, stand-alone or integrated computer platforms, or in communication with charged particle tools or other imaging devices, etc. Various aspects of the present disclosure can be implemented in machine-readable code stored on a non-transitory storage medium or device, whether removable or integrated into the computing platform, such as hard disks, optical read and/or write storage media, RAM, ROM, etc., such that it can be read by a programmable computer and used to configure and operate the computer to perform the processes described herein when the storage medium or device is read by the computer. Additionally, the machine-readable code, or portions of it, can be transmitted over wired or wireless networks. When such medium includes instructions or programs in combination with a microprocessor or other data processors to implement the processes described above, the inventions described in the present disclosure encompass these and other different types of non-transitory computer-readable storage medium. When programmed according to the methods and techniques described in the present disclosure, the present disclosure also includes the computer itself.

The above description is merely an example of the present disclosure and is not used to limit the present disclosure. For those skilled in the art, the present disclosure can have various modifications and variations. Any modifications, equivalent substitutions, improvements, etc., made within the spirit and principles of the present disclosure should be included within the scope of protection of the present disclosure.

What is claimed is:

1. A method for purging data fingerprint, wherein the method is applied to a storage engine in a distributed storage system, the method comprising a fingerprint purging procedure performed by the storage engine under a synchronized control of a master node, the fingerprint purging procedure for each of the storage engines comprising:
  performing a deduplication service suspending process;
  performing a fingerprint scanning process on a local Redirect-On-Write (ROW) database, for identifying valid fingerprints in a local fingerprint table, in response to a determination that all storage engines in the distributed storage system complete the deduplication service suspending process;
  performing a fingerprint purging process for deleting invalid fingerprints from the local fingerprint table after all the storage engines complete the fingerprint scanning process;

resuming deduplication services after all the storage engines complete the fingerprint purging process;
wherein the method further comprises: triggering the master node to instruct each of all the storage engines to perform the fingerprint purging procedure, comprising:
determining, by the storage engine, a deduplication data overwrite counting value since a last fingerprint purging procedure is performed by a node to which the storage engine belongs, and sending the deduplication data overwrite counting value to the master node;
receiving, by the master node, deduplication data overwrite counting values sent by all of the storage engines, summing up the deduplication overwrite counting values, and
triggering the master node to instruct each of all the storage engines to perform the fingerprint purging procedure in response to a determination that a sum of the deduplication overwrite counting values reaches or exceeds a preset watermark value.

2. The method of claim 1, wherein the fingerprint scanning process for identifying valid fingerprints in the local fingerprint table comprises:
identifying a fingerprint referenced by the local ROW database as a valid fingerprint by traversing the local ROW database;
sending the identified valid fingerprint to another storage engine to which the identified valid fingerprint belongs;
receiving a plurality of valid fingerprints belonging to the storage engine; and
identifying which fingerprint among all fingerprints belonging to the storage engine is valid.

3. The method of claim 2, wherein
the ROW database is a key-value database for persisting a redirection aggregation mapping relationship between a small I/O data write and a large I/O data write;
a fingerprint referenced by the ROW database is a referenced fingerprint in a value field of a deduplication-type.

4. The method of claim 2, wherein identifying which fingerprint among all fingerprints belonging to the storage engine is valid comprises:
generating a fingerprint validity bitmap based on the received valid fingerprints, and
using the fingerprint validity bitmap to identify a local valid fingerprint among all fingerprints belonging to the storage engine;
wherein each binary bit in the fingerprint validity bitmap corresponds to a fingerprint that belongs to the storage engine; a fingerprint corresponding to a binary bit 1 is valid; a fingerprint corresponding to a binary bit 0 is invalid.

5. The method of claim 4, wherein the performing a fingerprint purging process for deleting invalid fingerprints from the local fingerprint table comprises:
traversing the local fingerprint table; and
deleting each fingerprint marked as invalid corresponding to a binary bit 0 in the fingerprint validity bitmap from the local fingerprint table.

6. The method of claim 4, wherein
prior to the generating a fingerprint validity bitmap based on the received valid fingerprints, the method further comprises:
persisting the received valid fingerprints into a fingerprint reference table, wherein the fingerprint reference table is used to recover the fingerprint validity bitmap in case of power failure.

7. The method of claim 1, wherein
the deduplication data overwrite counting value determined by the storage engine is persisted in this storage engine in response to a determination that the deduplication data overwrite counting value determined by the storage engine reaches or exceeds an integer multiple of a preset persistence threshold value.

8. The method of claim 1, wherein:
states of all the storage engines in the distributed storage system during performing the fingerprint purging procedure are synchronized by the master node based on a fingerprint purging state machine.

9. An electronic device, comprising:
a processor;
a communication interface;
a storage; and
a communication bus; wherein the processor, the communication interface, the storage are intercommunicated via the communication bus;
the storage is to store machine-executable instructions;
the processor is to execute the machine-executable instructions to cause a storage engine in a distributed storage system to perform a fingerprint purging procedure under a synchronized control of a master node, wherein the fingerprint purging procedure comprises operations comprising:
performing a deduplication service suspending process;
performing a fingerprint scanning process on a local Redirect-On-Write (ROW) database, for identifying valid fingerprints in a local fingerprint table, in response to a determination that all storage engines in the distributed storage system complete the deduplication service suspending process;
performing a fingerprint purging process for deleting invalid fingerprints from the local fingerprint table after all storage engines complete the fingerprint scanning process;
resuming deduplication services after all the storage engines complete the fingerprint purging process;
wherein the operations further comprise: triggering the master node to instruct each of all the storage engines to perform the fingerprint purging procedure, comprising:
determining, by the storage engine, a deduplication data overwrite counting value since a last fingerprint purging procedure is performed by a node to which the storage engine belongs, and sending the deduplication data overwrite counting value to the master node;
receiving, by the master node, deduplication data overwrite counting values sent by all of the storage engines, summing up the deduplication overwrite counting values, and
triggering the master node to instruct each of all the storage engines to perform the fingerprint purging procedure in response to a determination that a sum of the deduplication overwrite counting values reaches or exceeds a preset watermark value.

10. The electronic device of claim 9, wherein the fingerprint scanning process for identifying valid fingerprints in the local fingerprint table comprises:

identifying a fingerprint referenced by the local ROW database as a valid fingerprint by traversing the local ROW database;
sending the identified valid fingerprint to another storage engine to which the identified valid fingerprint belongs;
receiving a plurality of valid fingerprints belonging to the storage engine; and
identifying which fingerprint among all fingerprints belonging to the storage engine is valid.

11. The electronic device of claim 10, wherein
the ROW database is a key-value database for persisting a redirection aggregation mapping relationship between a small I/O data write and a large I/O data write;
a fingerprint referenced by the ROW database is a referenced fingerprint in a value field of a deduplication-type.

12. The electronic device of claim 10, wherein identifying which fingerprint among all fingerprints belonging to the storage engine is valid comprises:
generating a fingerprint validity bitmap based on the received valid fingerprints, and
using the fingerprint validity bitmap to identify a local valid fingerprint among all fingerprints belonging to the storage engine;
wherein each binary bit in the fingerprint validity bitmap corresponds to a fingerprint that belongs to the storage engine; a fingerprint corresponding to a binary bit 1 is valid; a fingerprint corresponding to a binary bit 0 is invalid.

13. The electronic device of claim 12, wherein the performing a fingerprint purging process for deleting invalid fingerprints from the local fingerprint table comprises:

traversing the local fingerprint table; and
deleting each fingerprint marked as invalid corresponding to a binary bit 0 in the fingerprint validity bitmap from the local fingerprint table.

14. The electronic device of claim 12, wherein
prior to the generating a fingerprint validity bitmap based on the received valid fingerprints, the operations further comprise:
persisting the received valid fingerprints into a fingerprint reference table, wherein the fingerprint reference table is used to recover the fingerprint validity bitmap in case of power failure.

15. The electronic device of claim 9, wherein
the deduplication data overwrite counting value determined by the storage engine is persisted in this storage engine in response to a determination that the deduplication data overwrite counting value determined by the storage engine reaches or exceeds an integer multiple of a preset persistence threshold value.

16. The electronic device of claim 9, wherein:
states of all the storage engines in the distributed storage system during performing the fingerprint purging procedure are synchronized by the master node based on a fingerprint purging state machine.

17. A non-transitory machine-readable storage medium, wherein the non-transitory machine-readable storage medium stores machine-executable instructions to be invoked and executed by a processor to cause the processor to perform the method of claim 1.

* * * * *